US010508653B2

(12) United States Patent
Gu

(10) Patent No.: US 10,508,653 B2
(45) Date of Patent: Dec. 17, 2019

(54) MOTOR AND FAN INCLUDING THE MOTOR

(71) Applicant: Nidec Corporation, Kyoto (JP)

(72) Inventor: Zhaowu Gu, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 113 days.

(21) Appl. No.: 15/810,301

(22) Filed: Nov. 13, 2017

(65) Prior Publication Data
US 2018/0066665 A1 Mar. 8, 2018

Related U.S. Application Data

(63) Continuation-in-part of application No. 14/642,959, filed on Mar. 10, 2015, now abandoned.

(30) Foreign Application Priority Data

Mar. 28, 2014 (CN) .......................... 2014 1 0123875
Mar. 28, 2014 (CN) ...................... 2014 2 0149877 U

(51) Int. Cl.
*F04D 19/00* (2006.01)
*F04D 25/06* (2006.01)
(Continued)

(52) U.S. Cl.
CPC ......... *F04D 19/002* (2013.01); *F04D 25/062* (2013.01); *F04D 25/0646* (2013.01);
(Continued)

(58) Field of Classification Search
CPC ............... F04D 25/0613; F04D 25/062; F04D 25/0633; F04D 25/0693; F04D 25/0646; F04D 19/002; H02K 5/10
See application file for complete search history.

(56) References Cited

U.S. PATENT DOCUMENTS

2007/0126296 A1* 6/2007 Lee .......................... H02K 5/04
                                                            310/86
2008/0018187 A1* 1/2008 Yamaguchi ............ H02K 1/182
                                                            310/81
(Continued)

FOREIGN PATENT DOCUMENTS

JP      2006-246557 A     9/2006
JP      2013-021903 A     1/2013
WO      2007/139129 A1   12/2007

OTHER PUBLICATIONS

Gu, "Motor and Fan Including the Motor", U.S. Appl. No. 14/642,959, filed Mar. 10, 2015.

*Primary Examiner* — Kenneth J Hansen
(74) *Attorney, Agent, or Firm* — Keating & Bennett, LLP

(57) ABSTRACT

A motor includes a stationary portion and a rotary portion. The stationary portion includes an armature, a circuit board below the armature, and a base portion. The base portion includes a bearing holder and a radial gap is defined between the circuit board and a wall portion. The circuit board includes a through-hole passing through the circuit board, and at least one exhaust hole passing through the circuit board in an axial direction. A filler material is on upper and lower sides of the circuit board. The radial gap, a first exhaust hole extending in a radial direction, and a second exhaust hole extending in a circumferential direction from the first exhaust hole communicate with each other through an axial space between a lower surface and an upper surface of the base portion.

12 Claims, 5 Drawing Sheets

(51) Int. Cl.
    *H02K 11/33*  (2016.01)
    *H02K 5/10*   (2006.01)
    *H02K 15/14*  (2006.01)
(52) U.S. Cl.
    CPC ............ *H02K 5/10* (2013.01); *H02K 11/33* (2016.01); *H02K 15/14* (2013.01)

(56) References Cited

U.S. PATENT DOCUMENTS

| | | | |
|---|---|---|---|
| 2008/0218018 A1* | 9/2008 | Zhang | F04D 29/646 310/90 |
| 2010/0019629 A1 | 1/2010 | Amaya et al. | |
| 2012/0319543 A1 | 12/2012 | Adachi et al. | |

\* cited by examiner

MOTOR AND FAN INCLUDING THE MOTOR

BACKGROUND OF THE INVENTION

1. Field of the Invention

The present invention relates to a motor and a fan including the motor.

2. Description of the Related Art

A motor is used in many different environments. In the related art, it is known that dust proofing and water proofing of a motor can be realized by protecting a coil or a circuit board of the motor for the purpose of ensuring the operation of the motor even in harsh environments. For example, Japanese Patent No. 3432380 discloses that water proofing of a fan motor is realized by protecting a stator through the injection of a silicon resin. As shown in FIG. 1, a silicon resin 25 is injected into a mold space from a silicon resin injection port 30, thereby covering a circuit board 4 with the silicon resin and providing a water proofing effect. However, in the case of injecting filler, the fluidity of the filler is poor and it takes time to fill the filler since there is no exhaust hole for discharging air therethrough. Further, it is highly likely that the air remaining at the upper and the lower sides of the circuit board becomes air bubbles. If the bubbles are generated in the filling process, the water proofing effect of the motor is reduced.

SUMMARY OF THE INVENTION

Preferred embodiments of the present invention provide a motor having superior waterproof performance.

In accordance with a preferred embodiment of the present invention, a motor includes a stationary portion; and a rotary portion having a center axis, wherein the rotary portion is rotatably supported with respect to the stationary portion so as to rotate about the center axis. The stationary portion includes an armature, a circuit board disposed below the armature, and a base portion configured to support the armature and the circuit board. The base portion includes a bearing holder, a central tower portion configured to support the bearing holder, and a wall portion which surrounds the circuit board at a radial outer side such that a radial gap is defined between the circuit board and the wall portion. The circuit board includes a through-hole defined at a center thereof, and the central tower portion is configured to support a periphery of the through-hole. Filler is filled at an upper and a lower side of the circuit board and the circuit board includes at least one exhaust hole. The radial gap and the at least one exhaust hole communicate with each other through an axial space between a lower surface of the circuit board and an upper surface of the base portion.

By providing at least one exhaust hole in the circuit board, air is discharged during the filling process of the filler. Thus, the possibility of generation of air bubbles is reduced and electronic components of the circuit board are further reliably protected. This makes it possible to enhance a waterproof performance of the motor.

The fan provided with the motor includes an impeller, which rotate together with the rotary portion of the motor. Since the fan is provided with the motor having high waterproof performance, it is possible to improve the waterproof performance of the fan.

A motor according to a preferred embodiment of the present invention includes a stationary portion, and a rotary portion having a center axis, and rotatably supported with respect to the stationary portion so as to rotate about the center axis. The stationary portion includes an armature, a circuit board arranged below the armature, and a base portion configured to support the armature and the circuit board. The armature includes a core, a coil wound around the core, and a coil end portion extending from the coil, and connected to the circuit board. The base portion includes a bearing holder, a central tower portion configured to support the bearing holder, and a wall portion surrounding the circuit board at a radial outer side such that a radial gap is defined between the circuit board and the wall portion. The circuit board includes a through-hole passing through the circuit board in an axial direction at the center axis, and at least one exhaust hole passing through the circuit board in the axial direction. The central tower portion is arranged radially inside of a wall of the through-hole. A filler material is arranged on upper and lower sides of the circuit board. The radial gap and the at least one exhaust hole communicate with each other through an axial space between a lower surface of the circuit board and an upper surface of the base portion. The at least one exhaust hole includes a first exhaust hole extending in a radial direction, and a second exhaust hole extending in a circumferential direction from a radial end portion of the first exhaust hole. The coil end portion is arranged in the second exhaust hole.

A fan according to a preferred embodiment of the present invention includes the above-described motor, and an impeller configured to rotate together with the rotary portion of the motor.

Provision of the at least one exhaust hole in the circuit board allows air to be discharged therethrough during a filling process of the filler material. This reduces the likelihood that an air bubble will be generated, making protection of electronic components on the circuit board more secure. This leads to improved waterproof performance of the motor and the fan including the motor. Further, arranging the coil end portion in the second exhaust hole achieves improved ease of assembly when the coil end portion is connected to the circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A fan according to preferred embodiments of the present invention will now be described in detail with reference to the accompanying drawings. The preferred embodiments and the drawings are described below as examples and are not intended to limit the scope of the present invention. If necessary, the features of preferred embodiments of the present invention may be appropriately combined.

In the following description, the direction extending along a center axis O-O' of a rotary portion of a motor will be referred to as "axial". The direction orthogonal or substantially orthogonal to the center axis O-O' of the rotary portion will be referred to as "radial". The side of a rotor holder in the axial direction will be referred to as "upper". The side of a circuit board in the axial direction will be referred to as "lower". The direction going away from the center axis O-O' in the radial direction will be referred to as "outer". The direction coming toward the center axis O-O' in the radial direction will be referred to as "inner". However, the upper, lower, inner and outer directions are defined merely for the sake of description and are not intended to limit the in-use directions of a motor and a fan.

Figure 1:
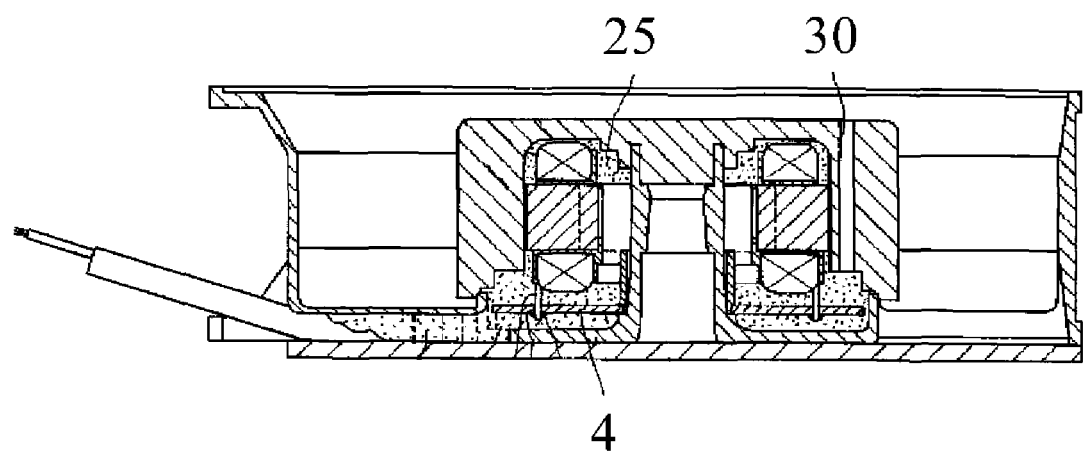
FIG. 1 is a sectional view of a conventional fan motor.
Figure 2:
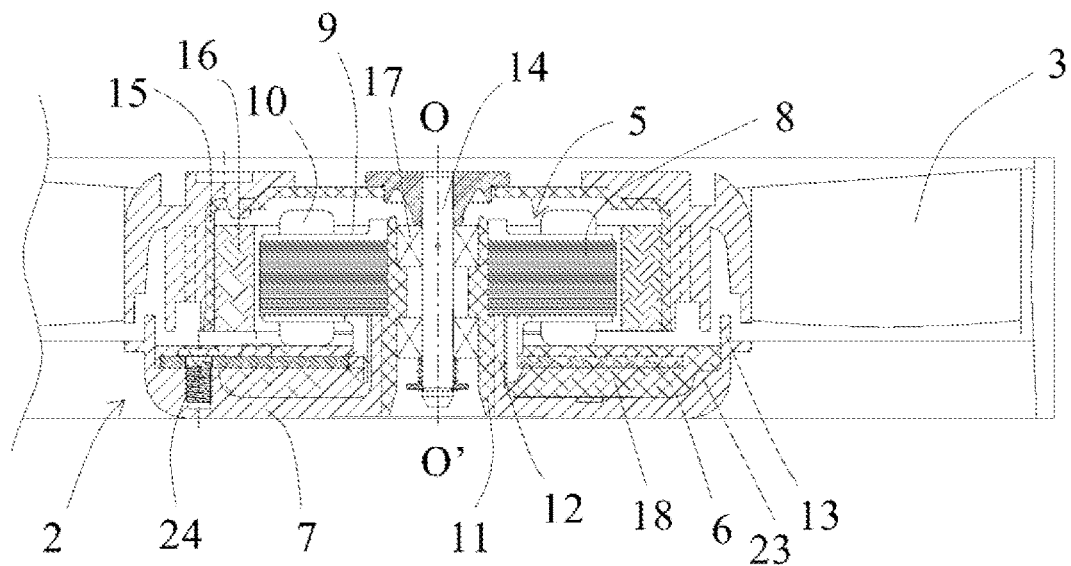
FIG. 2 is a partial sectional view a fan according to a preferred embodiment of the present invention.

FIG. 2 is a sectional view of a fan 1 according to a preferred embodiment of the present invention. The fan 1 preferably includes a motor 2 and an impeller 3. The motor preferably includes a stationary portion and a rotary portion having a center axis O-O'. The rotary portion is rotatably supported with respect to the stationary portion so as to rotate about the center axis O-O' of the rotary portion. The stationary portion preferably includes an armature 5, a circuit board 6 arranged below the armature 5, and a base portion 7 configured to support the armature 5 and the circuit board 6. The armature 5 preferably includes an iron core 8 and a coil 10 wound around the iron core 8 with an insulator 9 interposed therebetween. Electronic components are arranged on the circuit board 6 and lead wires configured to supply electric power therethrough are connected to the coil 10 to control the motor. The base portion 7 preferably includes a bearing holder 11, a central tower portion 12, and a wall portion 13. The central tower portion 12 supports the bearing holder 11. The wall portion 13 surrounds the circuit board 6 at the radial outer side.

The rotary portion preferably includes a shaft 14, a rotor holder 15, and a rotor magnet 16 attached to the inner surface of the rotor holder 15. The shaft 14 is arranged in a coaxial relationship with the center axis O-O' and is rotatably supported by a bearing 17 arranged in the bearing holder 11. The rotor holder 15 is directly or indirectly fixed to the shaft 14. Therefore, the rotor holder 15 rotates together with the shaft 14. The rotor magnet 16 is radially opposite to the armature 5. The impeller 3 is connected to the rotor holder 15 and is rotated together with the rotary portion of the motor 2. The motor 2 preferably further includes filler material 18 which is filled at the upper and the lower sides of the circuit board 6. Preferably, the filler material 18 is preferably composed of, for example, one or more of an epoxy resin, a silicon rubber and a polyurethane resin. These materials are superior in electrical insulation and waterproof characteristics.

Figure 3:
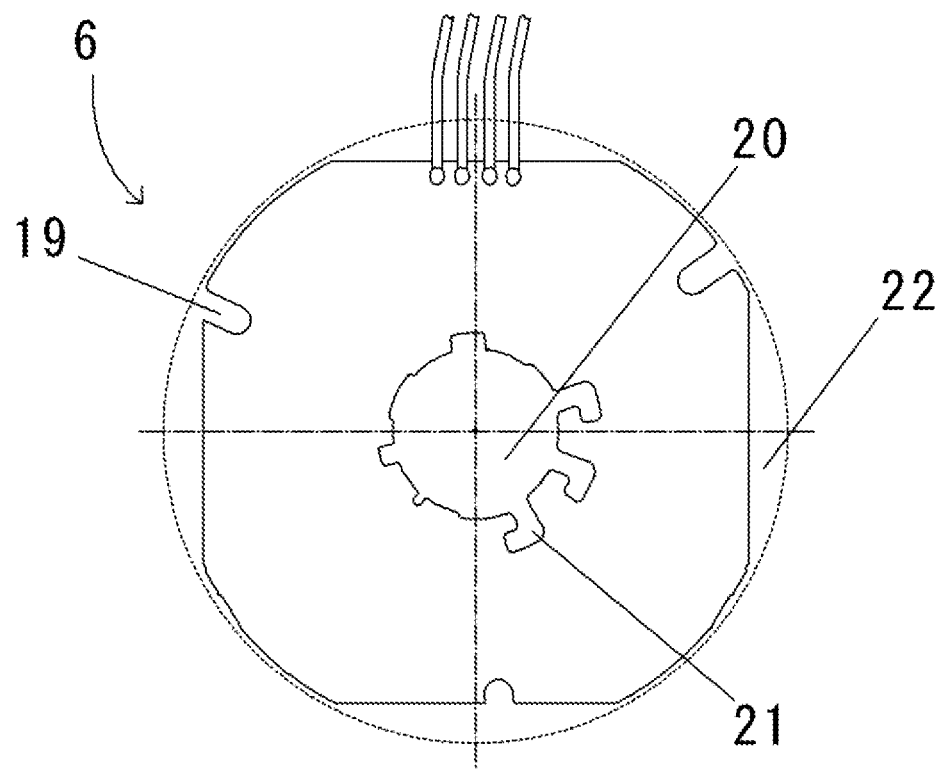
FIG. 3 is a top view of a circuit board of the fan according to a preferred embodiment of the present invention.

FIG. 3 is a top view of the circuit board of the motor of the fan according to a preferred embodiment of the present invention. The circuit board 6 is indicated by a solid line. The inner circumferential surface of the wall portion 13 of the base portion 7 is indicated by a dot line. As shown in FIG. 3, a radial gap 19 is defined between the circuit board 6 and the wall portion 13. This makes it easy to fill the filler material 18. The periphery of a through-hole 20 defined at the center of the circuit board 6 is supported on the central tower portion 12 of the base portion 7. Preferably, the central tower portion 12 of the base portion 7 includes a taper portion. The circuit board 6 is fixed to the taper portion by mounting the periphery of the through-hole 20 on the taper portion. Thus, the fixing of the circuit board 6 is realized. The circuit board 6 preferably includes at least one exhaust hole 21 arranged at or near the through-hole 20. The radial gap 19 and the exhaust hole 21 communicate with each other through an axial space between the lower surface of the circuit board 6 and the upper surface of the base portion 7. Since at least the exhaust hole 21 defining and serving as an exhaust port is provided in the circuit board 6, air existing between the circuit board 6 and the base portion 7 is reliably discharged during the filling process of the filler material 18. Thus, the possibility of generation of air bubbles is significantly reduced or prevented, which makes it possible to enhance the waterproof characteristics. Accordingly, it is possible to reliably protect the electronic components arranged on the circuit board 6 and the waterproof performance of the motor is further improved. In the illustrated example, the exhaust hole 21 and the through-hole 20 preferably communicate with each other. However, the exhaust hole 21 may be arranged around the through-hole 20 without communicating with the through-hole 20.

Outer cutouts 22 preferably are provided in the circuit board 6. In this case, the outer cutouts 22 are preferably located in the outer peripheral edge of the circuit board 6. This helps widen a space used for the injection of the filler material 18, thus improving the fluidity of the filler material 18. In the preferred embodiment shown in FIG. 3, the number of the outer cutouts 22 is preferably four, for example. Thus, the circuit board 6 preferably has a square or substantially square shape, for example. The number of the outer cutouts 22 may be arbitrarily changed without departing from the scope of the common knowledge of a person skilled in the art. Therefore, the circuit board may have a polygonal shape, for example. This makes it possible to increase the dimension of the injection port used for the filler material and to secure the exhaust port, eventually improving the fluidity of the filler material. In another preferred embodiment of the present invention, the respective exhaust holes 21 may radially correspond to the outer cutouts 22. This makes it possible to improve the fluidity of the filler in the filling process of the filler. In further another preferred embodiment of the present invention, at least one of the outer cutouts 22 may define and serve as an outlet of the lead wires of the circuit board 6. With this structure, it becomes easy to draw out the lead wires.

Referring again to FIG. 2, the base portion 7 preferably includes a step portion 23 which extends radially inward from the inner circumferential side of the wall portion 13 of the base portion 7. The step portion 23 supports the circuit board 6. The circuit board 6 may be fixed to the step portion 23 by, for example, a screw 24 or the like. By virtue of the step portion 23 on which the circuit board 6 is mounted, the fixing of the circuit board 6 is more reliably realized. In order not to hinder the communication between the radial gap 19 and the exhaust hole 21, it is preferred that the step portion 23 is not extended over the entire circumference but is divisionally disposed in three or more sections.

While the present invention has been described with respect to preferred embodiments of fan motors as examples, the above-described structure may be applied to other motor structures.

Preferred embodiments of the present invention additionally have the following advantages.

The central tower portion includes the taper portion. Since the taper portion receives the periphery of the through-hole of the circuit board, the circuit board is fixed without being radially deviated.

The step portion extending radially inward from the inner circumferential surface of the wall portion of the base portion is provided to support the circuit board. By virtue of the step portion, the circuit board is fixed even at the radial outer portion. Thus, the fixing of the circuit board becomes stable. In addition, the step portion and the circuit board is fixed to each other by the screw or the like.

Since the exhaust hole and the through-hole communicate with each other, air is discharged through the exhaust hole during the filling process of the filler. This provides an effect of preventing generation of air bubbles.

The circuit board includes the outer cutouts provided in the outer peripheral edge of the circuit board. This helps widen the injection space of the filler. It is therefore possible to accelerate the discharge of air and to improve the fluidity of the filler. By accelerating the discharge of air, there is provided an effect of preventing generation of air bubbles.

The exhaust holes are provided to radially correspond to the outer cutouts. This makes it possible to improve the fluidity of the filler in the filling process.

In one preferred embodiment of the present invention, at least one of the outer cutouts defines and serves as the outlet of the lead wires connected at one ends to the circuit board. This makes it easy to draw out the lead wires.

In another preferred embodiment of the present invention, the circuit board preferably has a polygonal shape, for example. This makes it possible to increase the dimension of the injection port to fill the filler and to improve the fluidity of the filler.

In a further preferred embodiment of the present invention, the filler is preferably composed of one or more of an epoxy resin, a silicon rubber and a polyurethane resin, for example. These materials are superior in insulation and waterproof characteristics.

Figure 4:
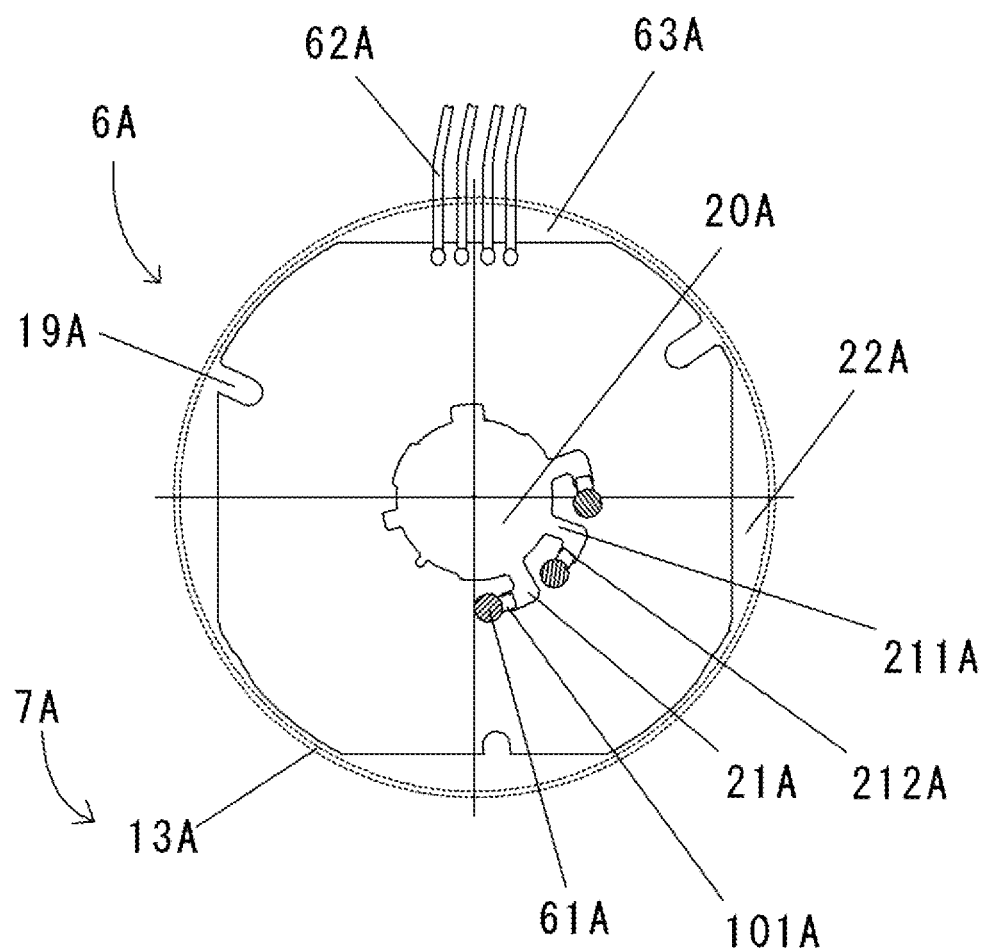
FIG. 4 is a top view of a circuit board of a motor of a fan according to a second preferred embodiment of the present invention.

FIG. 4 is a top view of a circuit board 6A of a motor of a fan according to a second preferred embodiment of the present invention. The circuit board 6A is represented by a solid line, while an inner circumferential surface of a wall portion 13A of a base portion 7A is represented by a dotted line. As illustrated in the figure, a radial gap 19A is defined between the circuit board 6A and the wall portion 13A, which facilitates the filling of a filler material. The circuit board 6A includes a through-hole 20A passing through the circuit board 6A in an axial direction at a center axis O-O', and at least one exhaust hole 21A passing through the circuit board 6A in the axial direction. A central tower portion is arranged radially inside of a wall of the through-hole 20A. The filler material is arranged on upper and lower sides of the circuit board 6A. The radial gap 19A and the at least one exhaust hole 21A communicate with each other through an axial space between a lower surface of the circuit board 6A and an upper surface of the base portion 7A. Each exhaust hole 21A includes a first exhaust hole 211A extending in a radial direction, and a second exhaust hole 212A extending in a circumferential direction from a radial end portion of the first exhaust hole 211A. That is, the exhaust hole 21A is a hole extending in the shape of the letter "L".

Since air outlets including at least the exhaust holes 21A are defined in the circuit board 6A, air existing between the circuit board 6A and the base portion 7A can be discharged therethrough during a filling process of the filler material. This reduces the likelihood that an air bubble will be generated, and leads to enhanced waterproof performance.

Accordingly, protection of electronic components on the circuit board 6A becomes more secure. This results in improved waterproof performance of the motor. In the illustrated example, each exhaust hole 21A is joined to the through-hole 20A. Note, however, that the exhaust hole 21A may not be joined to the through-hole 20A, and that the exhaust hole 21A may be arranged around the through-hole 20A without being joined to the through-hole 20A.

Outer cutouts 22A may be defined in the circuit board 6A. In this case, the outer cutouts 22A are preferably located in an outer peripheral edge of the circuit board 6A. This helps widen a space used for injection of the filler material, thus improving the fluidity of the filler material. In the preferred embodiment illustrated in FIG. 4, the number of outer cutouts 22A is four, and the circuit board 6A has a substantially quadrilateral shape. Note that the number of outer cutouts 22A may be arbitrarily changed without departing from the scope of the common knowledge of a person skilled in the art. Therefore, the circuit board may have a polygonal shape. This makes it possible to increase the dimensions of an injection port for the filler material to ensure sufficient air exhaust, thus achieving improved fluidity of the filler material. Each exhaust hole 21A may radially correspond to one of the outer cutouts 22A. This leads to an improvement in the fluidity of the filler material in the filling process. At least one of the outer cutouts 22A defines an outlet 63A for lead wires 62A connected to the circuit board 6A. This arrangement facilitates the drawing out of the lead wires 62A.

Figure 5:
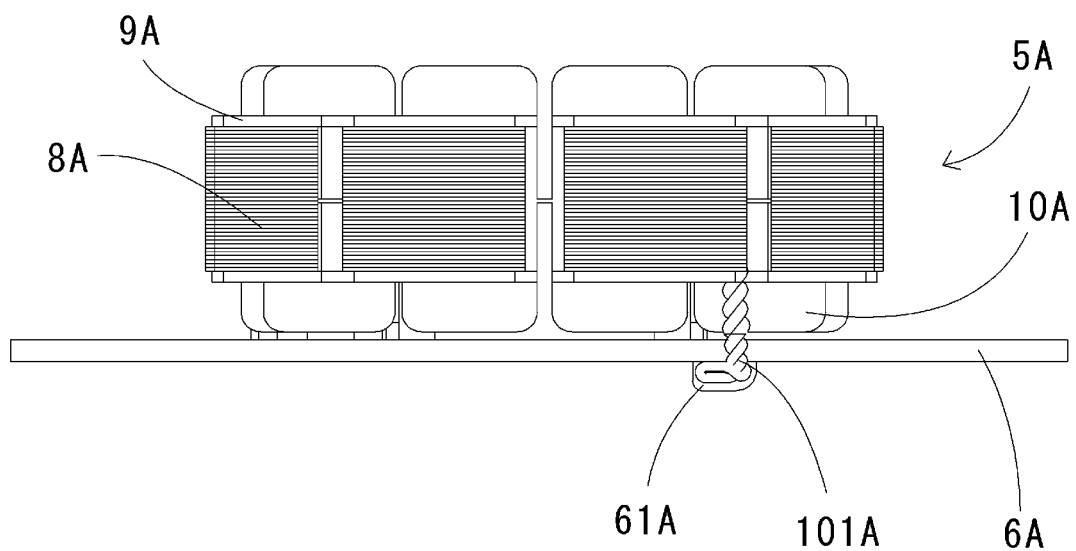
FIG. 5 is a side sectional view of an armature and the circuit board, which is connected to the armature, of the motor of the fan according to the second preferred embodiment.

FIG. 5 is a side sectional view of an armature 5A and the circuit board 6A, which is connected to the armature 5A, of the motor of the fan according to the second preferred embodiment. The armature 5A includes a core 8A, coils 10A each of which is wound around the core 8A with an insulator 9A therebetween, and coil end portions 101A each of which extends from the corresponding coil 10A and is connected to the circuit board 6A.

Each coil end portion 101A passes through one of the exhaust holes 21A, and is drawn out downwardly of the circuit board 6A. The coil end portion 101A is arranged in the second exhaust hole 212A. For example, if the coil end portion 101A is displaced from the second exhaust hole 212A, the coil end portion 101A passes through the adjacent first exhaust hole 211A. In this case, the coil end portion 101A is moved from the first exhaust hole 211A into the second exhaust hole 212A. Thus, the coil end portion 101A is arranged in the second exhaust hole 212A, achieving improved ease of assembly when the coil end portion 101A is connected to the circuit board 6A.

After the coil end portion 101A is arranged in the second exhaust hole 212A, the first exhaust hole 211A and a hole area of the second exhaust hole 212A, excluding an area in which the coil end portion 101A is arranged, define a hole through which the air existing between the circuit board 6A and the base portion 7A can be discharged. This reduces the likelihood that an air bubble will be generated in the filling process of the filler material, resulting in enhanced waterproof performance.

In the present preferred embodiment, the first exhaust hole 211A is joined to the through-hole 20A of the circuit board 6A. The filler material is arranged in the first exhaust hole 211A. That is, the first exhaust hole 211A is defined by a cut extending radially outward from an inner peripheral edge of the circuit board 6A. In the case where the coil end portion 101A is drawn out on a radially inner side of the corresponding coil 10A, for example, the coil end portion 101A may be tilted radially inward from a radially inner side of the circuit board 6A to be passed through the corresponding exhaust hole 21A.

The coil end portion 101A is bent in a direction parallel to the circuit board 6A along the lower surface of the circuit board 6A. The bent coil end portion 101A is connected to the circuit board 6A on the lower surface thereof through a solder 61A.

In the present preferred embodiment, the motor includes the plurality of exhaust holes 21A. Each exhaust hole 21A includes the first exhaust hole 211A and the second exhaust hole 212A. The plurality of coil end portions 101A drawn out from the coils 10A are passed through the respective exhaust holes 21A to be drawn out downwardly of the circuit board 6A, and are connected to the circuit board 6A. This makes it possible to connect the coil end portions 101A to the circuit board 6A through the solder 61A while maintaining a space between adjacent ones of the coil end portions 101A, and to achieve improved workability. In the present preferred embodiment, the number of exhaust holes 21A provided in the motor is three.

Each of the coil end portions 101A is extended downward from the armature 5A in a manufacturing process. In the present preferred embodiment, the second exhaust hole 212A of each exhaust hole 21A extends to the same side in the circumferential direction from the radial end portion of the first exhaust hole 211A. This makes it possible to arrange each of the coil end portions 101A in the corresponding second exhaust hole 212A by moving each coil end portion 101A in one direction when the coil end portions 101A are passed through the respective exhaust holes 21A, and to achieve improved workability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a stationary portion; and
   a rotary portion having a center axis, and rotatably supported with respect to the stationary portion so as to rotate about the center axis; wherein
   the stationary portion includes:
     an armature;
     a circuit board below the armature; and
     a base portion that supports the armature and the circuit board;
   the armature includes:
     a core;
     a coil wound around the core; and
     a coil end portion extending from the coil, and connected to the circuit board;
   the base portion includes:
     a bearing holder;
     a central tower portion that supports the bearing holder; and
     a wall portion surrounding the circuit board at a radial outer side such that a radial gap is defined between the circuit board and the wall portion;
   the circuit board includes:
     a through-hole passing through the circuit board in an axial direction at the center axis; and
     at least one exhaust hole passing through the circuit board in the axial direction;
   the central tower portion is radially inside of a wall of the through-hole;
   a filler material is on upper and lower sides of the circuit board;
   the radial gap and the at least one exhaust hole communicate with each other through an axial space between a lower surface of the circuit board and an upper surface of the base portion;
   the at least one exhaust hole includes:
     a first exhaust hole extending in a radial direction; and
     a second exhaust hole extending in a circumferential direction from a radial end portion of the first exhaust hole;
   the coil end portion is in the second exhaust hole; and
   the second exhaust hole is continuously connected to and extends out from the first exhaust hole.

2. The motor of claim 1, wherein
   the first exhaust hole is joined to the through-hole of the circuit board; and
   the filler material is arranged in the at least one exhaust hole.

3. The motor of claim 1, wherein the at least one exhaust hole includes a plurality of the first exhaust holes and the second exhaust holes.

4. The motor of claim 3, wherein the second exhaust holes extend to a same side in the circumferential direction from the radial end portions of the first exhaust holes.

5. The motor of claim 1, wherein the central tower portion includes a taper portion, and the periphery of the through-hole is supported by and fixed to the taper portion.

6. The motor of claim 1, wherein the base portion further includes a step portion extending radially inward from an inner circumferential surface of the wall portion of the base portion, and the circuit board is fixed to the step portion.

7. The motor of claim 1, wherein the circuit board further includes one or more outer cutouts located in an outer peripheral edge of the circuit board.

8. The motor of claim 7, wherein the at least one exhaust hole radially corresponds to the one or more outer cutouts.

9. The motor of claim 7, wherein at least one of the one or more outer cutouts defines an outlet of lead wires connected to the circuit board.

10. The motor of claim 1, wherein the circuit board has a polygonal shape.

11. The motor of claim 1, wherein the filler material is selected from a group consisting of an epoxy resin, a silicon rubber, and a polyurethane resin.

12. A fan comprising:
   the motor of claim 1; and
   an impeller that rotates together with the rotary portion of the motor.

* * * * *